United States Patent Office 3,391,893
Patented July 9, 1968

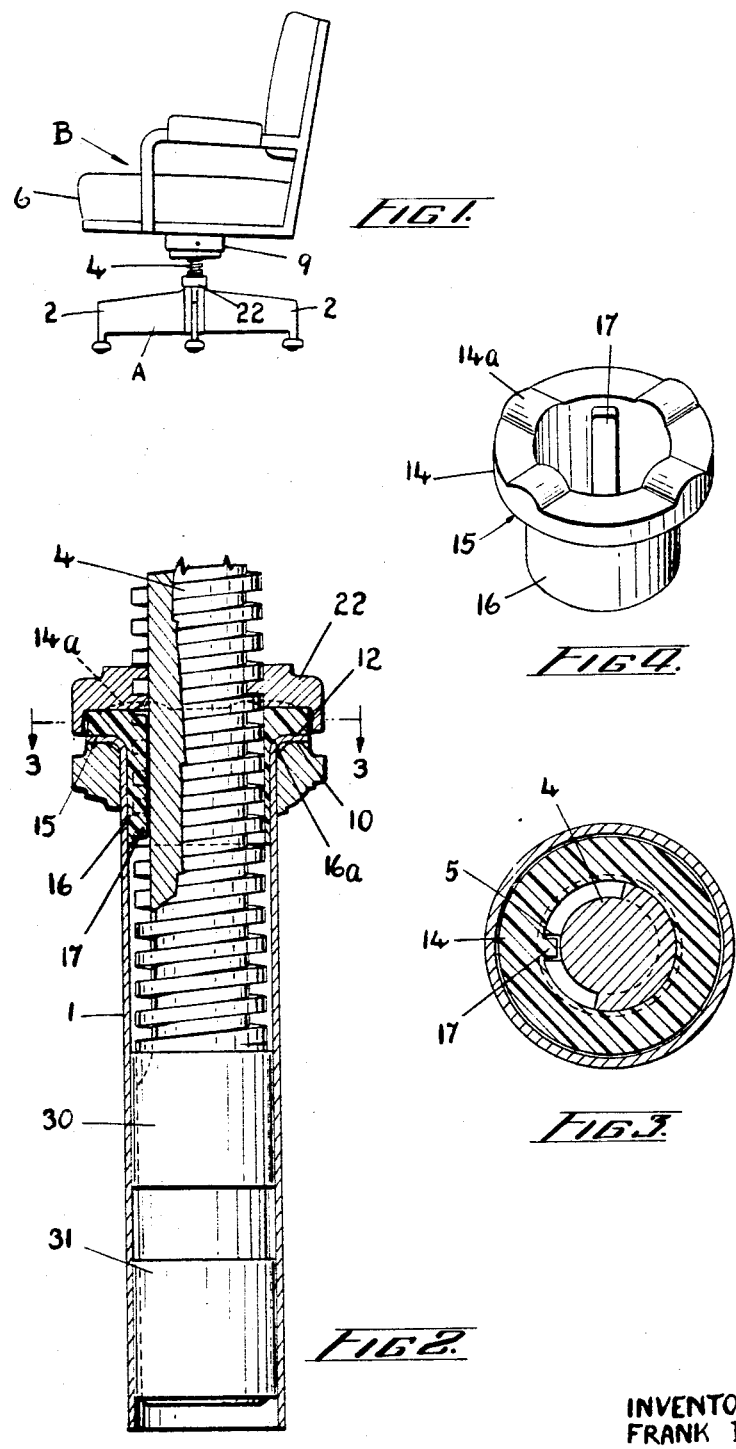

3,391,893
THRUST BEARING FOR A SWIVEL CHAIR
Frank Doerner, Waterloo, Ontario, Canada, assignor to Frank Doerner & Sons Limited, Waterloo, Ontario, Canada, a corporation of Ontario
Filed Feb. 14, 1966, Ser. No. 527,376
2 Claims. (Cl. 248—405)

ABSTRACT OF THE DISCLOSURE

A height-adjustment element for swivel-tilter chair controls comprising an integral thrustwasher-bearing element, adapted for rotation with the seat of a chair and the chair spindle, and having a tubular body or bearing portion with an outwardly extending, integral thrust collar on which are formed conventional detents for co-operation with a height-adjusting nut member.

---

This invention relates to a swivel seat construction and more particularly to a novel bearing element used in mounting the rotatable spindle which supports the seat for rotation about a vertical axis.

Included in the bearing elements presently used are the frusto-conical bearing elements and dish-shaped plastic bearing elements of the type illustrated and described in U.S. Patents No. 2,859,799 and Finn Lie No. 3,059,888. The plastic bearing element described in the Finn Lie patent is deflectable or deformable under load to grip the spindle, and is subject to permanent deformation due to cold flow of the plastic, and such deformation may cause the bearing element to seize on the spindle. This, of course, is a disadvantage. A further disadvantage with bearing elements having frusto-conical and dish-shaped bearing surfaces is that the bearing surface area is large and as a consequence the frictional resistance of the bearing is high.

A further disadvantage of the Finn Lie patent resides in the tapered seat formed in the upper end of the post to receive the frusto-conical bearing element. In manufacturing the flaring end of the Fnn Lie structure there is a large wastage by reason of split or cracked seats.

Another disadvantage of the structure devised by Finn Lie is that the bearing element, to operate satisfactorily, is provided with a vertical slit which extends radially through the body. This is necessary to enable the bearing element to accommodate itself under load to the tapered seat on the end of the post.

To obviate the disadvantages exemplified above, the present invention teaches what may be termed, an integral thrustwasher and spindle bearing, which incorporates the usual detents for co-operation with a height-adjusting nut. The present invention precludes uneven wear and deformation while greatly simplyfying the manufacture of associated parts such as the spindle housing or post.

With the foregoing considerations in mind, it is an object of the present invention to provide, in a swivel seat support structure, a plastic bearing element, preferably in nylon, in which deformation of the bearing element due to cold flow or deflection, or deformation from other causes is eliminated or substantially reduced.

It is another object of the invention to provide a swivel seat support having a bearing element with low frictional resistance and which provides adequate distribution of the load imposed on the bearing without radial thrust and avoids objectionable play or wobble between the seat and the support structure.

Still other objects and advantages of the invention will become apparent from the following description and appended claims.

Referring now to the drawings in which like references refer to like parts;

FIGURE 1 is a side elevation of a conventional swivel chair employing this invention.

FIGURE 2 is a vertical section through the chair support structure of this exemplification.

FIGURE 3 is a section taken on the line 3—3 of FIGURE 2 and

FIGURE 4 is a perspective view of the bearing element.

The swivel chair is illustrated in FIGURE 1 of the drawings and comprises generally; a conventional base structure A which includes a hollow metal post 1 supported by radial arms 2 extending therefrom, mounted on casters, and a conventional seat structure B mountable on a conventional spindle 4 which is mounted in the hollow post 1 in the manner to be described.

The seat structure B includes a seat 6 with a seat back and arms rigidly connected thereto and a conventional chair control member 9 attached to the underside of the seat 6 and to the top of the spindle. The chair control 9 permits the seat to have backward tilting movement.

The top end of the post 1 is provided with an integral outwardly directed horizontal thrust bearing 10, the upper face of which forms an upper thrust bearing surface 12. The bearing 10 may be formed by swagging with the collar extending outwardly at a right angle to the post. This swagging is done preferably on a relatively small radius to avoid a sharp corner.

The bearing element of the present invention is illustrated, in perspective, in FIGURE 4 and comprises an annular thrust collar 14, with its under surface 15 arranged to lie flat on the bearing surface 12 of the bearing 10, and a tubular portion 16 which fits snugly into the upper end of the post 1 and also receives the spindle 4. Consequently the bearing element and the spindle are axially aligned relative to the post. The collar 14 and tubular portion are made of a plastic such as nylon or Teflon and made in one piece by injection moulding. The upper surface of the collar 14 is provided with cam shaped projections 14a for the purpose to be described. When the bearing 10 is formed with a radius, the outer surface of the tubular portion 16 is smoothly rounded at its juncture 16a to mate with the radius of the collar.

The inner cylindrical surface of the tubular portion 16 is provided with an integrally formed spline 17, which fits into a keyway 5 formed in the spindle so that the spindle and the bearing element rotate together. The spindle 4 is threaded, in the usual manner, along a substantial portion of its length, and the longitudinal keyway 5 is formed therein. The spindle 4 extends through the tubular portion 16 into the tubular post 1 and has nylon bearing sleeves 30 and 31 on the lower end thereof which together with the tubular portion 16 of the thrust collar 14 provide bearings for the spindle.

Seated on the upper face of the thrust collar 14 is an adjustable support nut 22 which has recesses that receive the projections 14a providing a releasable locking action between the collar and the nut so that in normal use the nut and bearing will rotate together. The entire load on the seat is carried by the nut 22, thrust bearing 10 and thrust collar 14 without substantial radial thrust.

What I claim as new and desire to protect by Letters Patent of the United States is:

1. In a swivel chair construction having a base, a vertical tubular post supported by the base, a threaded spindle rotatably supported by the post, and a seat mounted on the top end of the spindle, means for mounting said spindle in said tubular post comprising the combination of an outwardly extending horizontal collar formed on the upper end of the tubular post and forming a substantially flat horizontal bearing surface, a removable thrust bearing having a tubular body portion rotatably fitting into the upper end of the post and surrounding and connected for rotation therewith to said spindle, said body portion having an outwardly extending integrally formed thrust collar supported on said bearing surface, a bearing nut adjustably threaded onto said spindle and supported on the collars whereby the axial thrust of the seat and and its load is transmitted to the base without radial thrust, and means on each of and releasably interconnecting said thrust collar and nut for causing said nut to rotate with said spindle and bearing except during a height adjustment.

2. Mounting means according to claim 1, including bearing sleeve means fixed to a lower part of the spindle and engageable with and normally spaced below the thrust bearing and rotatably engaging the post for limiting the upward adjustment of the spindle and radially supporting said lower part thereof.

References Cited
UNITED STATES PATENTS

| | | | |
|---|---|---|---|
| 2,999,665 | 9/1961 | Ericson et al. | 248—405 |
| 3,059,888 | 10/1962 | Lie | 248—161 |
| 3,161,396 | 12/1964 | Anderson | 248—405 |
| 3,169,744 | 2/1965 | Nocek et al. | 248—405 |
| 3,218,021 | 11/1965 | Michalshi | 248—405 XR |

ROY D. FRAZIER, *Primary Examiner.*

R. P. SEITTER, *Assistant Examiner.*